Oct. 30, 1951     W. D. TEAGUE, JR     2,573,231
PILOT-OPERATED RELIEF VALVE
Filed Dec. 26, 1947
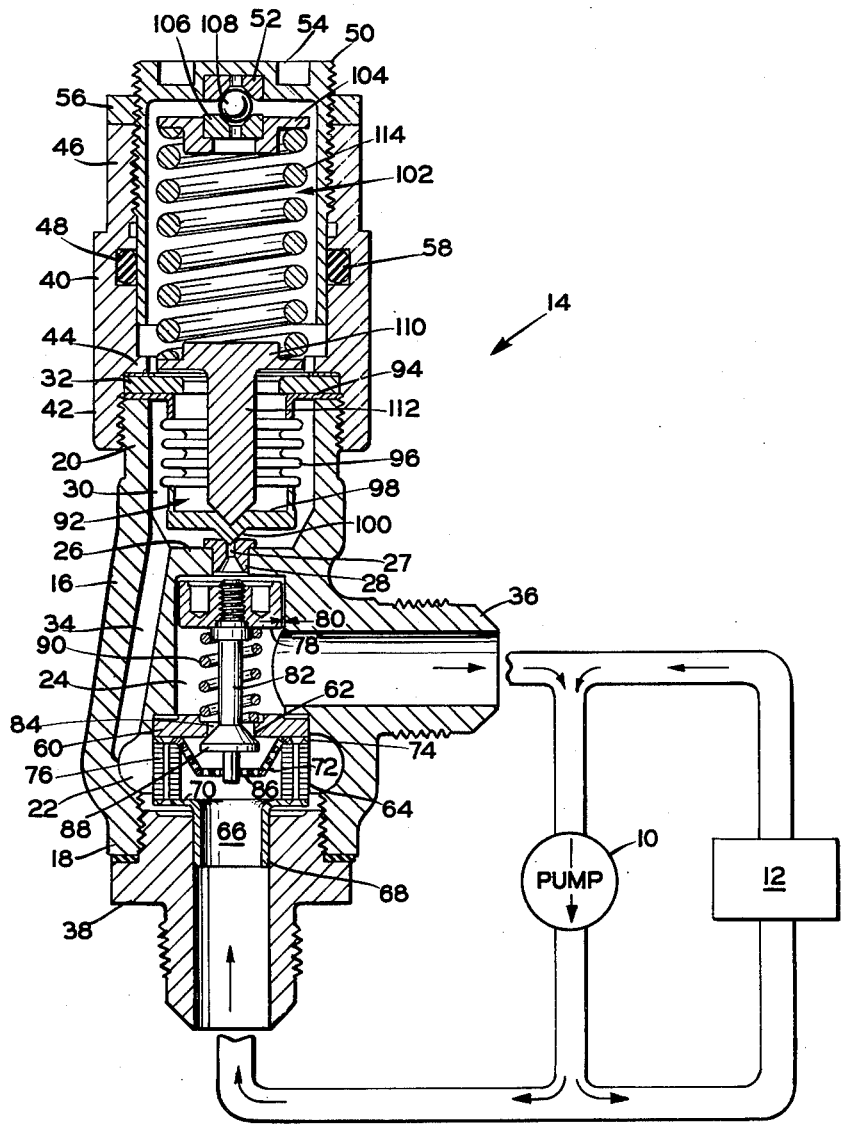
INVENTOR
WALTER D. TEAGUE, JR.
BY
Frederic H. Miller
ATTORNEY Patented Oct. 30, 1951

2,573,231

UNITED STATES PATENT OFFICE 2,573,231

PILOT-OPERATED RELIEF VALVE

Walter D. Teague, Jr., Alpine, N. J., assignor to Bendix Aviation Corporation, Teterboro, N. J., a corporation of Delaware Application December 26, 1947, Serial No. 793,966

3 Claims. (Cl. 137—53)

The invention hereof relates to pilot operated relief valves, and particularly to a valve of this character which is adapted to maintain constant pressure irrespective of flow variations.

An object of the invention is to provide a pilot operated relief valve which is accurate over a wide range of flows.

Another object is to provide a valve unit which provides very accurate pressure regulation without resort to large low-rate regulating springs.

Another object is to provide a novel seal construction such that the unit will regulate pressure to a constant absolute value irrespective of changes in operating altitude.

Another object is to utilize the normally disadvantageous feature of leakage past a piston, which is usually undesired and therefore of indifferent value, by providing a defined clearance between the piston and its cylinder and employing it for flow regulating purposes, instead of forming duct means through the piston or providing other special construction.

Other objects are to provide a bellows structure, a filter unit, a spring and screw bearing device and other features of novelty and advantage individually, and in combination in a valve of the character set forth.

The above and other objects and features of the invention will appear more fully hereinafter from a consideration of the following description taken in connection with the accompanying drawings wherein one embodiment of the invention is illustrated by way of example.

In the drawing the single figure is a side view, generally in section, but having parts in elevation, of a fluid system including a valve structure embodying the invention, the view also showing a diagram of a fluid circuit for which the valve is adapted.

Referring to the drawing:

The invention is adapted for operation in a fluid system including a turbo pump 10 and a pump load 12 connected in series circuit relation to each other, and comprises a valve 14 adapted for shunt relation to the load, as shown.

A housing of the valve 14 comprises a body 16 including, in the position shown, from an internally screw threaded bottom inlet end 18 to an externally screw-threaded top portion 20, in the order named, a filter space 22, a cylinder 24, a partition 26 having a regulating through orifice 27 in an inset 28, and a bellows space 30 in the top 20.

The housing further comprises a washer 32 on the top 20, a small passage or conduit 34 by-passing the cylinder 24 between the filter and bellows spaces 22 and 30, respectively, a cylinder side outlet 36, a tube connector 38 threaded in the end 18, and a sleeve 40 having a bottom end 42 threaded around the top 20, an inner shoulder 44 against the washer 32, an internally threaded upper end length 46 and an intermediate annular inner groove 48.

The housing is completed by a combination cap and pressure adjusting screw in the form of an inverted cup 50 in the sleeve 40 threaded to the length 46, and having a bearing insert 52 in the closed end 54 of the cup 50, and a ring lock nut 56 around the cup 50 acting against the sleeve 40.

Elements within the above-described housing comprise a seal ring 58 compressed in the groove 48 by the cup 50, a valve disc 60 between the filter space 22 and the cylinder 24 having an underside seat 62; a filter unit 64 comprising a member 66 having a tubular portion 68 telescoping the connector 38 and a flange 70 in the filter space 22; a perforate dish-like element 72 having a top flange 74 under the disc 60, and a tubular filter portion proper 76 between the flanges 70 and 74.

An imperforate by-pass-piston 78 disposed in, and having definite clearance 80 relative to, the cylinder 24, has a stem 82 extending through an aperture 84 in the disc 60 axially slidably journaled in a bottom wall 86 of the element 72 and carrying a by-pass valve member 88 for the seat 62. A compression spring 90 is disposed between the piston 78 and the disc 60 for normally holding the by-pass valve 88 closed against its seat 62.

A pressure-regulating bellows unit 92 comprises an upper flange 94, between the washer 32 and the body 16, and a cupped bellows portion proper 96 depending from the upper flange 94 including a bottom wall 98 having a small substantially conical or U-section regulating valve portion 100 for constricting the orifice 27.

A spring unit 102 includes a top spring seat 104 having a bearing inset 106, a single-ball bearing 108 between the bearing insets 52 and 106, a bottom spring seat 110 over the washer 32 having a depending extension 112 fitting the V-section 100, and an adjustable pressure regulating spring 114 in compression between the seats 104 and 110.

In operation, if the outlet pressure of the turbo pump 10 rises too high through the passage 34 to the bellows space 30, the bellows 96 acts against its spring 114 to lift the regulating valve 100 off its seat on the orifice inset 28. This action admits high pressure fluid from the bellows space 30 through the orifice 27 to the cylinder 24 at the upper end of the by-pass piston 78, causing the latter to open the by-pass valve 88 against the force of the spring 90 and the unbalanced fluid pressure acting on the valve 62. The latter action causes the discharge pressure of the pump 10 to drop, thus allowing the pressure regulating valve 100 to partially close the orifice 27. At this point, the flow through the regulating orifice 27 equals the predetermined flow through the clearance 80, and the unit stabilizes.

Conversely, if the pump discharge pressure drops too low, the pressure regulating valve 100 will further close the regulating orifice 27. This action reduces the flow to the upper end of the piston 78, and the pressure above the piston drops as the fluid leaks past the piston through the clearance 80. This action allows the fluid pressure and the spring 90 to partially close the bypass valve 88, thus raising the pump pressure to a preset value.

The invention, in the principle and construction of its pilot feature, provides very accurate pressure regulation without resort to a large low rate regulating spring or springs; in the sealing and combination cap and pressure adjusting screw, provides for sealing off the chamber above the bellows 96 so that the unit regulates pressure to a constant absolute value irrespective of changes in operating altitude; and in the simplified and readily manufactured and assembled nature of its parts, provides a pilot-operated relief valve which is of substantial improvement and advantage in its field.

Although only one embodiment of the invention has been illustrated and described, various changes in the form and relative arrangements of the parts may be made to suit requirements.

What is claimed is:

1. In combination in a valve, a housing body including, in one position from an interiorly screw threaded bottom fluid inlet end to an exteriorly threaded top portion in the order named, a filter space, a cylinder, a partition having a through orifice inset, and a bellows space in said top; a washer on said top, a conduit between the filter and bellows spaces, and a cylinder side outlet; a tube connector threaded in said end; a sleeve having a bottom end threaded around said top, an inner shoulder against said washer, an internally-threaded upper end length and an intermediate annular inner groove; an inverted cup in the sleeve threaded to said length and having a closed-end bearing insert; a ring lock nut around the cup against the sleeve; a seal ring compressed in the groove by the cup; a valve disc between the filter space and the cylinder having an underside seat; a filter unit comprising a member having a portion telescoping said connector and a flange in the filter space; a perforate dish-like element having a top flange under the disc, and a tubular filter portion between said flanges; an imperforate piston having definite clearance relative to the cylinder wall, providing for a given flow past the piston, and having a stem extending through the disc journaled in said element and carrying a valve member for said seat to regulate fluid pressure at said bottom fluid inlet; a compression spring between the piston and the disc; a unit comprising an upper flange between said washer and said body and a cupped bellows depending from the upper flange including a bottom wall having a V-section valve portion for the orifice of said inset, and a spring unit including a top spring seat having a bearing inset, a single-ball bearing between said bearing insets, a bottom spring seat over the washer having a depending extension fitting the V-section, and a spring in compression between said seats.

2. In a pressure regulating valve of the type including a housing having an inlet and an outlet, a partition between said inlet and outlet including a first orifice, a main valve biased toward a position closing said first orifice, a piston connected to said valve above said outlet, a compartment above said piston, a conduit connecting said inlet to said compartment, a second orifice between said compartment and said piston, said piston being constructed and arranged to force open said valve in response to flow from said inlet through said second orifice, and a pilot relief valve mechanism for controlling the flow through said second orifice in response to inlet pressure; the improvement comprising a filter space formed in said housing adjacent said inlet, a tube connector mounted in said inlet; a filter unit comprising a member having a portion telescoping said connector and a flange disposed in said filter space, a perforate dish-like element having a flange, a tubular filter element between said flanges, said filter unit being operative to filter flow from said inlet to said conduit and first orifice.

3. In a pressure regulating valve of the type including a housing having an inlet and an outlet and a first orifice interposed between said inlet and outlet, a main valve biased toward a position closing said first orifice, a piston connected to said valve above said outlet, a compartment above said piston, a conduit connecting said inlet to said compartment, a second orifice between said compartment and said piston, said piston being constructed and arranged to open said first orifice in response to flow from said inlet through said second orifice, and a pilot relief valve mechanism for controlling flow through said second orifice in response to inlet pressure; the improvement in which said pilot relief valve mechanism comprises a bellows positioned in said compartment and having a flange adapted to engage the end of said housing, said bellows having an end wall adapted to coact with said second orifice, a washer on said flange, a sleeve mounted at one end thereof to said housing adjacent said compartment and having an internal shoulder engaging said washer, said sleeve having an internally threaded portion at the other end thereof, an inverted cup in said sleeve having an externally threaded portion engaging the internally threaded portion of said sleeve, said sleeve having a ring groove intermediate the internally threaded portion and shoulder thereof, a seal ring compressed in said groove by said cup, a bearing insert in the end wall of said cup, a first spring seat, a ball bearing between the bearing insert and said first spring seat, a second spring seat having a depending stem adapted to engage the end wall of said bellows, a spring in compression between said spring seats, the compression of said spring between the first and second spring seats being adjustable by moving the cup within the sleeve.

WALTER D. TEAGUE, JR.

REFERENCES CITED

The following references are of record in the file of this patent:

UNITED STATES PATENTS

| Number | Name | Date |
|---|---|---|
| 738,161 | Christensen | Sept. 8, 1903 |
| 1,248,665 | Karnasch | Dec. 4, 1917 |
| 1,612,567 | Browne | Dec. 28, 1926 |
| 1,615,285 | Krichbaum | Jan. 25, 1927 |
| 2,408,708 | Tweedle | Oct. 1, 1946 |
| 2,487,418 | Birkemeier | Nov. 8, 1949 |